(12) United States Patent
Abraham et al.

(10) Patent No.: US 9,485,783 B2
(45) Date of Patent: Nov. 1, 2016

(54) ENHANCED MULTICHANNEL ACCESS FOR VERY HIGH THROUGHPUT

(75) Inventors: Santosh P. Abraham, San Diego, CA (US); Sameer Vermani, San Diego, CA (US); Hemanth Sampath, San Diego, CA (US); Vinay Sridhara, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 573 days.

(21) Appl. No.: 12/544,023

(22) Filed: Aug. 19, 2009

(65) Prior Publication Data

US 2010/0284393 A1 Nov. 11, 2010

Related U.S. Application Data

(60) Provisional application No. 61/176,427, filed on May 7, 2009.

(51) Int. Cl.
*H04W 72/12* (2009.01)
*H04L 5/00* (2006.01)

(52) U.S. Cl.
CPC .......... *H04W 72/1289* (2013.01); *H04L 5/005* (2013.01); *H04L 5/0023* (2013.01); *H04L 5/0037* (2013.01); *H04L 5/0044* (2013.01); *H04L 5/0053* (2013.01); *H04L 5/0094* (2013.01)

(58) Field of Classification Search
CPC .... H04B 1/707; H04B 7/0617; H04B 7/216; H04B 7/2628; H04L 5/0007; H04L 12/413; H04W 24/00; H04W 72/0446; H04W 80/04; H04W 84/12; H04W 72/1263; H04J 3/00; H04Q 7/00; H04Q 7/20
See application file for complete search history.

(56) References Cited

U.S. PATENT DOCUMENTS

| 2004/0085934 | A1* | 5/2004 | Balachandran | H04B 7/2628 370/335 |
|---|---|---|---|---|
| 2005/0141545 | A1* | 6/2005 | Fein | H04B 7/0617 370/445 |
| 2006/0126996 | A1* | 6/2006 | Beshai | 385/17 |
| 2006/0182077 | A1* | 8/2006 | Scherzer et al. | 370/338 |
| 2007/0147284 | A1* | 6/2007 | Sammour | H04J 3/0605 370/328 |
| 2009/0082031 | A1* | 3/2009 | Kim | H04W 72/1263 455/452.2 |
| 2009/0147790 | A1* | 6/2009 | Kang et al. | 370/395.4 |
| 2009/0252200 | A1* | 10/2009 | Dohler et al. | 375/141 |
| 2010/0067478 | A1* | 3/2010 | Dillinger et al. | 370/330 |

(Continued)

FOREIGN PATENT DOCUMENTS

| EP | 1641308 | | 3/2006 | |
|---|---|---|---|---|
| EP | 1641308 | A1 * | 3/2006 | ............... H04Q 7/38 |

(Continued)

OTHER PUBLICATIONS

Multiband mobile communication system and transmitter used therein, EP 1641308 A1, Naoto Matoba, Date of Filing: Sep. 22, 2005.*

(Continued)

*Primary Examiner* — Andrew Lai
*Assistant Examiner* — Leon Andrews
(74) *Attorney, Agent, or Firm* — Dang M. Vo

(57) ABSTRACT

Certain aspects of the present disclosure relate to a method for enhanced multichannel access where multiple simultaneous transmissions can occur each spanning a subset of frequency bands.

52 Claims, 12 Drawing Sheets

(56) References Cited

U.S. PATENT DOCUMENTS

2010/0067505 A1* 3/2010 Fein et al. ............... 370/338
2011/0286369 A1* 11/2011 Kosaka ................... 370/280
2011/0305217 A1* 12/2011 Seok ....................... 370/329

FOREIGN PATENT DOCUMENTS

| EP | 1881647 | | 1/2008 | |
|---|---|---|---|---|
| EP | 1881647 | A1 * | 1/2008 | ............. H04L 12/28 |

OTHER PUBLICATIONS

Terminal Control Apparatus and Wireless LAN System, EP 1881647 A1, Yukimasa Nagai, Date of Filing: Feb. 5, 2006.*
EP 1641308 A1—Multiband mobile communication system and transmitter used therein, Inventor: Naoto Matoba, Date of Filing: Sep. 22, 2005.*
EP 1881647 A1—Terminal control apparatus and wireless LAN system, Inventor: Yukimasa Nagai, Date of filing: Feb. 5, 2006.*
Title: Multiband mobile communication system and transmitter used therein, Applicant: NTT DoCoMo, Inc., Inventors: Naoto Matoba et al., Date of Filing: Sep. 22, 2005.*
Title: Terminal Control Apparatus and Wireless LAN System, Inventor, Applicant: Mitsubishi Electric Corporation, Inventor: Yukimasa Nagai, Date of Filing: May 2, 2006.*
International Search Report and Written Opinion—PCT/US2010/032482, International Search Authority—European Patent Office—Aug. 9, 2010.
Syafei W., et al., "A Gigabit Mimo Wlan system with international standardization strategy," Ntelligent Signal Processing and Communication Systems, 2009, 228-231.

* cited by examiner

| Field | VHT (bits) | HT (bits) |
|---|---|---|
| MCS | 8 | 7 |
| CBW | 1 | 1 |
| Length | 17 | 16 |
| Smoothing/Sounding/Short GI | Not used | 3 |
| Aggregation/Packet format | 3 | 1 |
| STBC | 3 | 2 |
| FEC Coding | 1 | 1 |
| Number of extension LTFs | Not used | 2 |
| Reserved | 1 | 1 |
| Tail | 6 | 6 |
| CRC | 8 | 8 |
| TOTAL | 48 | 48 |

FIG. 9

| Packet Format | Use |
|---|---|
| 0000 | SDMA |
| 0001 | Multichannel APPDU (20MHz or 80MHz) |
| 0100 | Multichannel APPDU (40,60MHz); This channel and down |
| 0101 | Multichannel APPDU (40,60MHz); This channel and up |
| 0111 | Multichannel APPDU (40,60MHz); This channel and up and down |
| 1111 | VHT-SIG Extension Present |

FIG. 10

ENHANCED MULTICHANNEL ACCESS FOR VERY HIGH THROUGHPUT

CLAIM OF PRIORITY UNDER 35 U.S.C. §119

The present Application for Patent claims benefit of Provisional Application No. 61/176,427 filed May 7, 2009, and assigned to the assignee hereof and hereby expressly incorporated by reference herein.

BACKGROUND

1. Field

Certain aspects of the present disclosure generally relate to wireless communications and, more particularly, to multichannel access where multiple simultaneous transmissions can span multiple frequency bands.

2. Background

In order to address the issue of increasing bandwidth requirements that are demanded for wireless communications systems, different schemes are being developed to allow multiple user terminals (i.e., stations) to communicate with a single access point by sharing the channel resources while achieving high data throughputs. Multiple input multiple output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

Utilization of the Aggregate Physical Layer Protocol Data Unit (APPDU) was previously considered as a time division multiple access (TDMA) technique, while a single frequency band is utilized. The cost of training to multiple Stations (STAs) can be reduced by employing a common preamble before data transmission. Each STA's transmission can be preceded by a Very High Throughput Signal (VHT-SIG) frame which informs the STA of its modulation-coding scheme (MCS) as different STAs can potentially have different MCS.

However, there is still a need in the art for a method to further increase transmission data rates and to more efficiently utilize available channel bandwidth.

SUMMARY

Certain aspects provide a method for wireless communications. The method generally includes transmitting information for scheduling multiple simultaneous exchanges of data frames with a plurality of wireless nodes, wherein the scheduling information indicates, for each of the wireless nodes, at least one of a plurality of frequency bands to be used for exchange of at least one of the data frames, and exchanging the data frames with the wireless nodes over the plurality of frequency bands according to the scheduling information.

Certain aspects provide an apparatus for wireless communications. The apparatus generally includes a transmitter configured to transmit information for scheduling multiple simultaneous exchanges of data frames with a plurality of wireless nodes, wherein the scheduling information indicates, for each of the wireless nodes, at least one of a plurality of frequency bands to be used for exchange of at least one of the data frames, and a circuit configured to exchange the data frames with the wireless nodes over the plurality of frequency bands according to the scheduling information.

Certain aspects provide an apparatus for wireless communications. The apparatus generally includes means for transmitting information for scheduling multiple simultaneous exchanges of data frames with a plurality of wireless nodes, wherein the scheduling information indicates, for each of the wireless nodes, at least one of a plurality of frequency bands to be used for exchange of at least one of the data frames, and means for exchanging the data frames with the wireless nodes over the plurality of frequency bands according to the scheduling information.

Certain aspects provide a computer-program product for wireless communications. The computer-program product includes a computer-readable medium comprising instructions executable to transmit information for scheduling multiple simultaneous exchanges of data frames with a plurality of wireless nodes, wherein the scheduling information indicates, for each of the wireless nodes, at least one of a plurality of frequency bands to be used for exchange of at least one of the data frames, and exchange the data frames with the wireless nodes over the plurality of frequency bands according to the scheduling information.

Certain aspects provide an access point. The access point generally includes at least one antenna, a transmitter configured to transmit via the at least one antenna information for scheduling multiple simultaneous exchanges of data frames with a plurality of wireless nodes, wherein the scheduling information indicates, for each of the wireless nodes, at least one of a plurality of frequency bands to be used for exchange of at least one of the data frames, and a circuit configured to exchange the data frames with the wireless nodes over the plurality of frequency bands according to the scheduling information.

Certain aspects provide a method for wireless communications. The method generally includes receiving scheduling information indicating at least two frequency bands, of a plurality of frequency bands, to be used for exchanging data frames with an apparatus, and exchanging the data frames with the apparatus in accordance with the scheduling information.

Certain aspects provide an apparatus for wireless communications. The apparatus generally includes a receiver configured to receive scheduling information indicating at least two frequency bands, of a plurality of frequency bands, to be used for exchanging data frames with another apparatus, and a circuit configured to exchange the data frames with the other apparatus in accordance with the scheduling information.

Certain aspects provide an apparatus for wireless communications. The apparatus generally includes means for receiving scheduling information indicating at least two frequency bands, of a plurality of frequency bands, to be used for exchanging data frames with another apparatus, and means for exchanging the data frames with the other apparatus in accordance with the scheduling information.

Certain aspects provide a computer-program product for wireless communications. The computer-program product includes a computer-readable medium comprising instructions executable to receive scheduling information indicating at least two frequency bands, of a plurality of frequency bands, to be used for exchanging data frames with an apparatus, and exchange the data frames with the apparatus in accordance with the scheduling information.

Certain aspects provide an access terminal. The access terminal generally includes at least one antenna, a receiver configured to receive via the at least one antenna scheduling information indicating at least two frequency bands, of a plurality of frequency bands, to be used for exchanging data frames with an access point, and a circuit configured to exchange the data frames with the access point in accordance with the scheduling information.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 9 illustrates an example structure of a very-high-throughput signal (VHT-SIG) field within multi-channel APPDU in accordance with certain aspects of the present disclosure.

FIG. 10 illustrates examples of different values of the packet format sub-field of a modified VHT-SIG field in accordance with certain aspects of the present disclosure.

DETAILED DESCRIPTION

Figure 1:
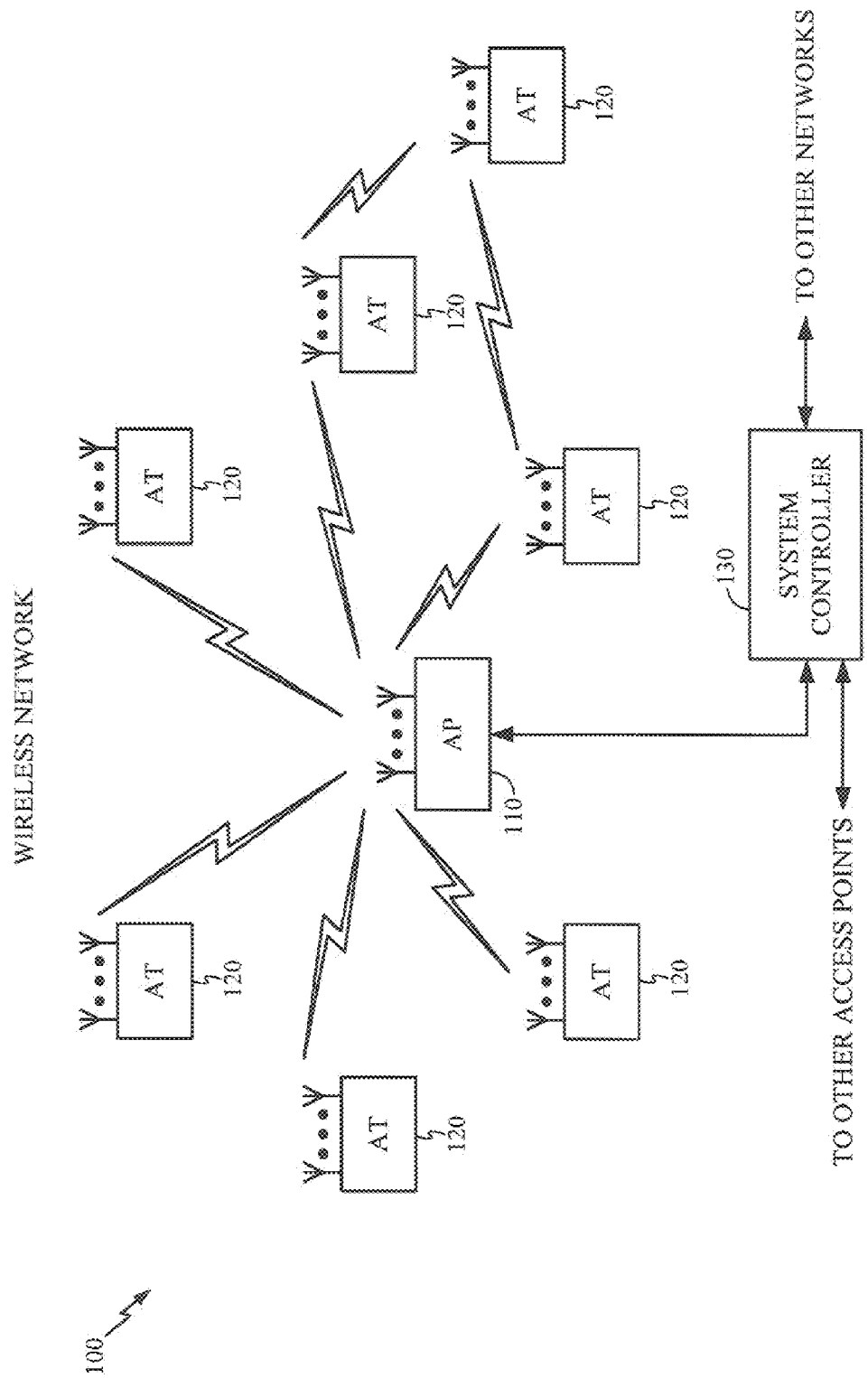
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Several aspects of a wireless network will now be presented with reference to FIG. 1. The wireless network 100 is shown with several wireless nodes, generally designated as nodes 110 and 120. Each wireless node is capable of receiving and/or transmitting. In the discussion that follows the term "receiving node" may be used to refer to a node that is receiving and the term "transmitting node" may be used to refer to a node that is transmitting. Such a reference does not imply that the node is incapable of performing both transmit and receive operations.

In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage; however, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

One or more access terminals 120 may be equipped with multiple antennas to enable certain functionality. With this configuration, multiple antennas at the access point 110 may be used to communicate with a multiple antenna access terminal to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the invention will be described with reference to a MIMO system supporting any suitable wireless technology, such as Orthogonal Frequency Division Multiplexing (OFDM). OFDM is a technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this invention are not limited to any particular wireless technology and/or air interface standard.

Figure 2:
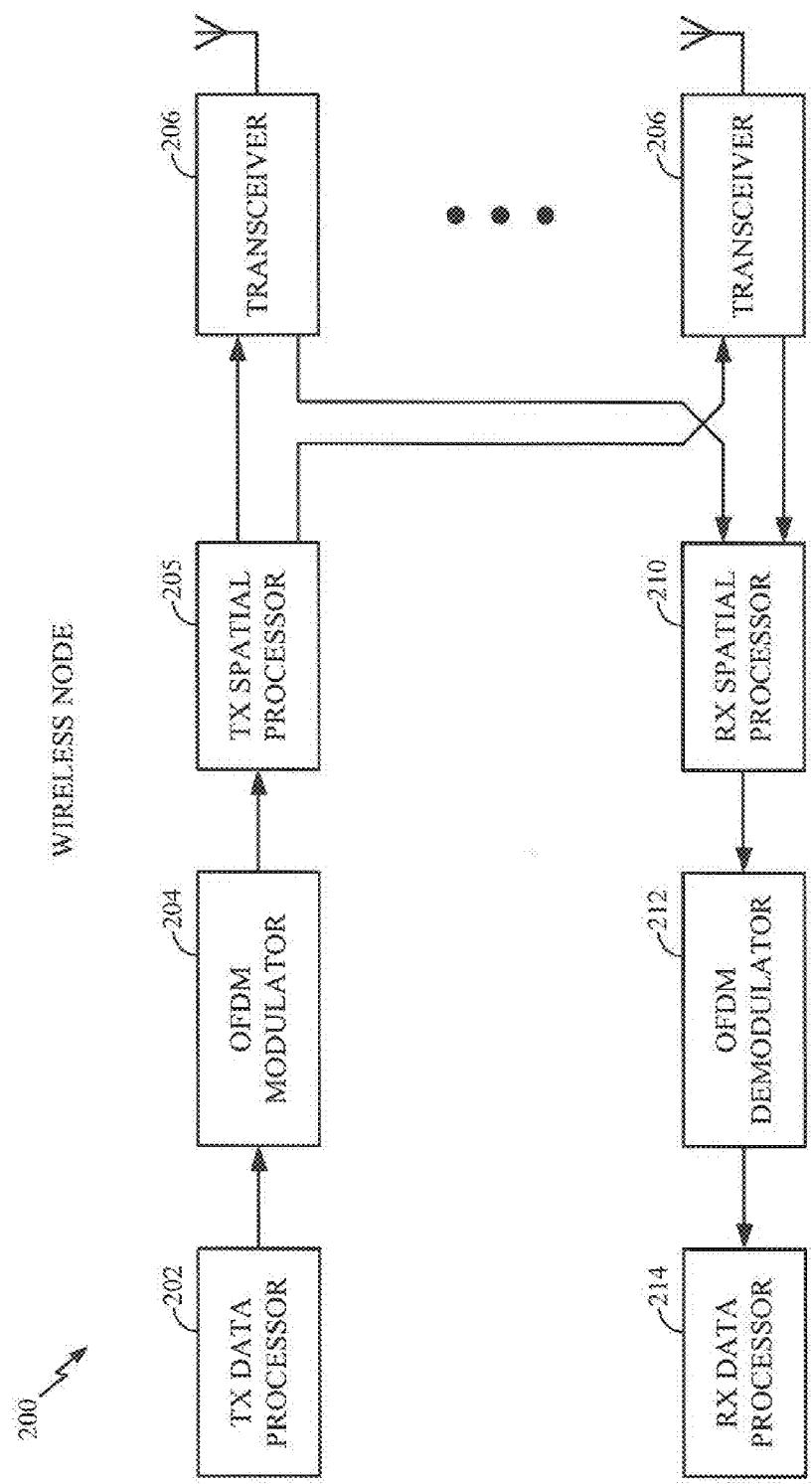
FIG. 2 illustrates a block diagram of an example of signal processing functions of a physical layer (PHY) of a wireless node in the wireless communications network of FIG. 1 in accordance with certain aspects of the present disclosure.

FIG. 2 is a conceptual block diagram illustrating an example of the signal processing functions of the PHY layer. In a transmit mode, a TX data processor 202 may be used to receive data from the MAC layer and encode (e.g., Turbo code) the data to facilitate forward error correction (FEC) at the receiving node. The encoding process results in a sequence of code symbols that that may be blocked together and mapped to a signal constellation by the TX data processor 202 to produce a sequence of modulation symbols.

In wireless nodes implementing OFDM, the modulation symbols from the TX data processor 202 may be provided to an OFDM modulator 204. The OFDM modulator splits the modulation symbols into parallel streams. Each stream is then mapped to an OFDM subcarrier and then combined together using an Inverse Fast Fourier Transform (IFFT) to produce a time domain OFDM stream.

A TX spatial processor 206 performs spatial processing on the OFDM stream. This may be accomplished by spatially precoding each OFDM and then providing each spatially precoded stream to a different antenna 208 via a transceiver 206. Each transmitter 206 modulates an RF carrier with a respective precoded stream for transmission over the wireless channel.

In a receive mode, each transceiver 206 receives a signal through its respective antenna 208. Each transceiver 206 may be used to recover the information modulated onto an RF carrier and provide the information to a RX spatial processor 210.

The RX spatial processor 210 performs spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 200, they may be combined by the RX spatial processor 210.

In wireless nodes implementing OFDM, the stream (or combined stream) from the RX spatial processor 210 is provided to an OFDM demodulator 212. The OFDM demodulator 212 converts the stream (or combined stream) from time-domain to the frequency domain using a Fast Fourier Transform (FFT). The frequency domain signal comprises a separate stream for each subcarrier of the OFDM signal. The OFDM demodulator 212 recovers the data (i.e., modulation symbols) carried on each subcarrier and multiplexes the data into a stream of modulation symbols.

A RX data processor 214 may be used to translate the modulation symbols back to the correct point in the signal constellation. Because of noise and other disturbances in the wireless channel, the modulation symbols may not correspond to an exact location of a point in the original signal constellation. The RX data processor 214 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 214 then uses the sequence of code symbol LLRs in order to decode the data that was originally transmitted before providing the data to the MAC layer.

Figure 3:
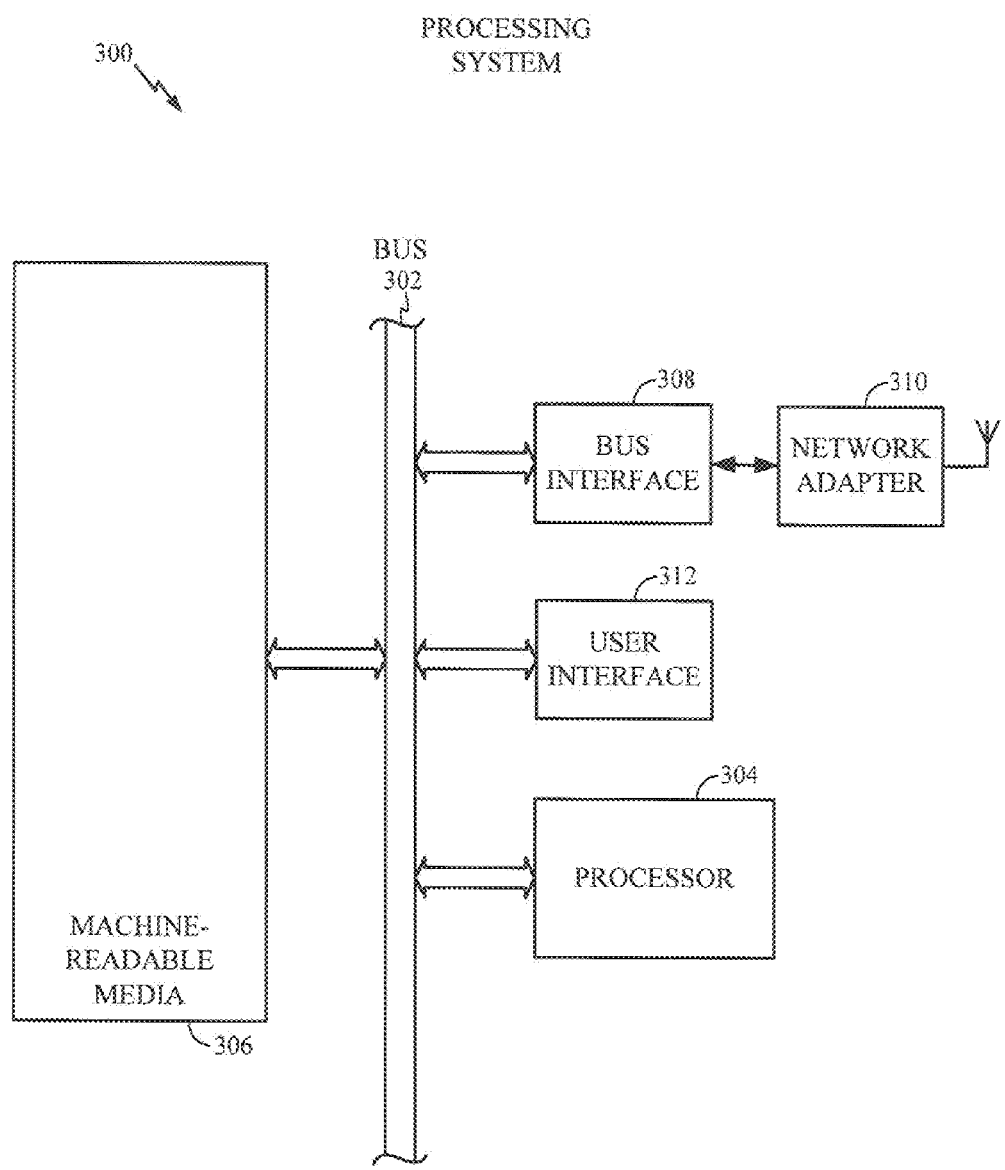
FIG. 3 illustrates a block diagram of an exemplary hardware configuration for a processing system in a wireless node in the wireless communications network of FIG. 1 in accordance with certain aspects of the present disclosure.

FIG. 3 is a conceptual diagram illustrating an example of a hardware configuration for a processing system in a wireless node. In this example, the processing system 300 may be implemented with a bus architecture represented generally by bus 302. The bus 302 may include any number of interconnecting buses and bridges depending on the specific application of the processing system 300 and the overall design constraints. The bus links together various circuits including a processor 304, machine-readable media 306, and a bus interface 308. The bus interface 308 may be used to connect a network adapter 310, among other things, to the processing system 300 via the bus 302. The network adapter 310 may be used to implement the signal processing functions of the PHY layer. In the case of an access terminal 110 (see FIG. 1), a user interface 312 (e.g., keypad, display, mouse, joystick, etc.) may also be connected to the bus. The bus 302 may also link various other circuits such as timing sources, peripherals, voltage regulators, power management circuits, and the like, which are well known in the art, and therefore, will not be described any further.

The processor 304 is responsible for managing the bus and general processing, including the execution of software stored on the machine-readable media 306. The processor 304 may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In the hardware implementation illustrated in FIG. 3, the machine-readable media 306 is shown as part of the processing system 300 separate from the processor 304. However, as those skilled in the art will readily appreciate, the machine-readable media 306, or any portion thereof, may be external to the processing system 300. By way of example, the machine-readable media 306 may include a transmission line, a carrier wave modulated by data, and/or a computer product separate from the wireless node, all which may be accessed by the processor 304 through the bus interface 308. Alternatively, or in addition to, the machine readable media 306, or any portion thereof, may be integrated into the processor 304, such as the case may be with cache and/or general register files.

The processing system 300 may be configured as a general-purpose processing system with one or more microprocessors providing the processor functionality and external memory providing at least a portion of the machine-readable media 306, all linked together with other supporting circuitry through an external bus architecture. Alternatively, the processing system 300 may be implemented with an ASIC (Application Specific Integrated Circuit) with the processor 304, the bus interface 308, the user interface 312 in the case of an access terminal), supporting circuitry (not shown), and at least a portion of the machine-readable media 306 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system 300 depending on the particular application and the overall design constraints imposed on the overall system.

Data may be communicated between the access point (AP) 110 and access terminals (stations) 120 of the wireless network 100 within an Aggregate Physical Layer Protocol Data Unit (APPDU) frame. The APPDU may be transmitted according to a time division multiple access (TDMA) technique on a single frequency band. The cost of training of multiple user stations (STAs) may be reduced by employing a common preamble at the beginning of the transmission. Each STA's transmission may be preceded by a Very High Throughput Signal (VHT-SIG) field, which informs a particular STA of its modulation-coding scheme (MCS) as different STAs may potentially have different MCS. In the present disclosure, this scheme is extended to a multichannel case, i.e. multiple contiguous fixed frequency bands (e.g. 20 MHz frequency bands) may be available for transmission.

In future WLAN systems, availability of multiple contiguous fixed bandwidths (e.g. 20 MHz bandwidths) may be envisaged for communication between wireless nodes. The wireless system 100 may comprise a variety of STAs 120 with different bandwidth capabilities and the AP 110 capable of scheduling transmissions to multiple STAs 120 across multiple frequency bands.

Certain aspects of the present disclosure support a scheme where multiple simultaneous APPDU transmissions may exist each spanning a subset of frequency bands. A simple forward compatible protocol can be defined providing flexibility of expanding or contracting the bandwidth within the APPDU transmission. It is shown in the present disclosure how the VHT-SIG field may be used to signal a bandwidth of the ensuing packet. Hence, the proposed solution may lead to a highly granular yet simple design, where seamless transmission to a plurality of STAs with different SNRs (and hence different MCSs), different rate requirements and different bandwidth capabilities may be achieved. If a wider bandwidth is used for some APPDUs, then transmission efficiency may be improved because guard tones can be also utilized.

Multichannel Modes of Operation

Certain aspects of the present disclosure support contiguous band operation. For example, a contiguous sequence of 20 MHz channels can be considered. At any given time, access points (APs) and user stations (STAs) in a wireless system may either perform transmission or reception. The APs and the STAs may restrict transmissions to a subset of the contiguous frequency bands, e.g. for the purpose of link budgeting, multiple access, etc.

Certain aspects of the present disclosure support discrete band operation. This means that each AP may transmit data on one frequency band while simultaneously receiving different data on another frequency band.

The proposed multichannel access scheme may allow for efficient multiplexing of STAs to achieve uplink and downlink transmissions with high data throughputs. Two different data transmission techniques (i.e., protocols) may be employed: a multichannel enhanced APPDU protocol and a multichannel uplink protocol.

Multichannel Enhanced APPDU Protocol

Certain aspects of the present disclosure support downlink data transmission to multiple STAs using a multichannel Aggregate Physical Layer Protocol Data Unit (APPDU). Block Acknowledgement (BA) messages may be transmitted from the STAs on an uplink according to a Frequency Division Multiplexing (FDM) scheme to amortize an uplink transmission time overhead.

Figure 4:
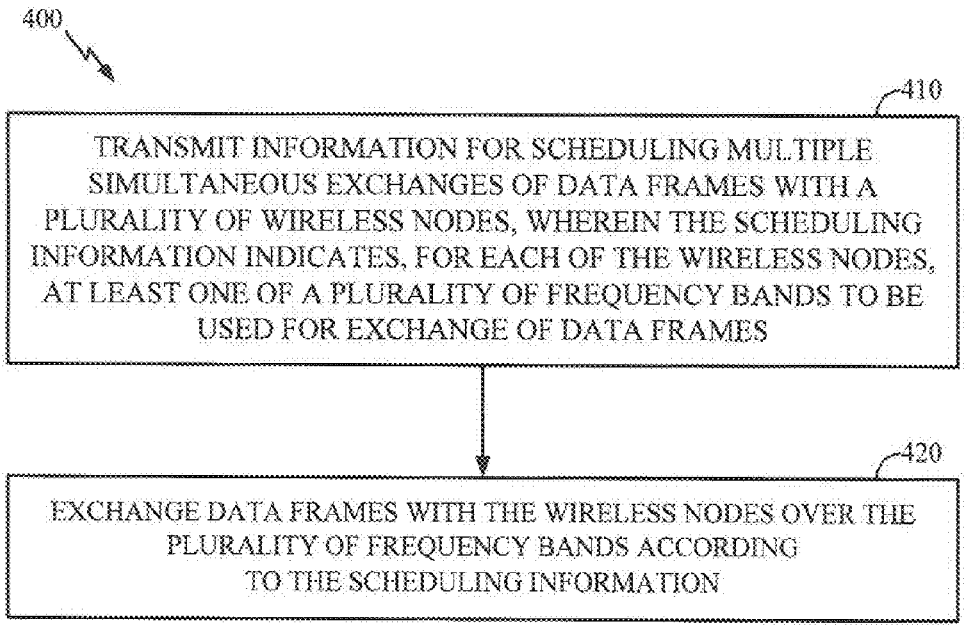
FIG. 4 illustrates example operations for communicating between wireless nodes using multiple frequency bands in accordance with certain aspects of the present disclosure.

FIG. 4 illustrates example operations 400 for communicating between wireless nodes using multiple frequency bands in accordance with certain aspects of the present disclosure. At 410, information for scheduling multiple simultaneous exchanges of data frames with a plurality of wireless nodes may be transmitted, wherein the scheduling information indicates, for each of the wireless nodes, at least one of a plurality of frequency bands to be used for exchanging data frames. At 420, data frames may be exchanged with the wireless nodes over the frequency bands according to the scheduling information.

Figure 5:
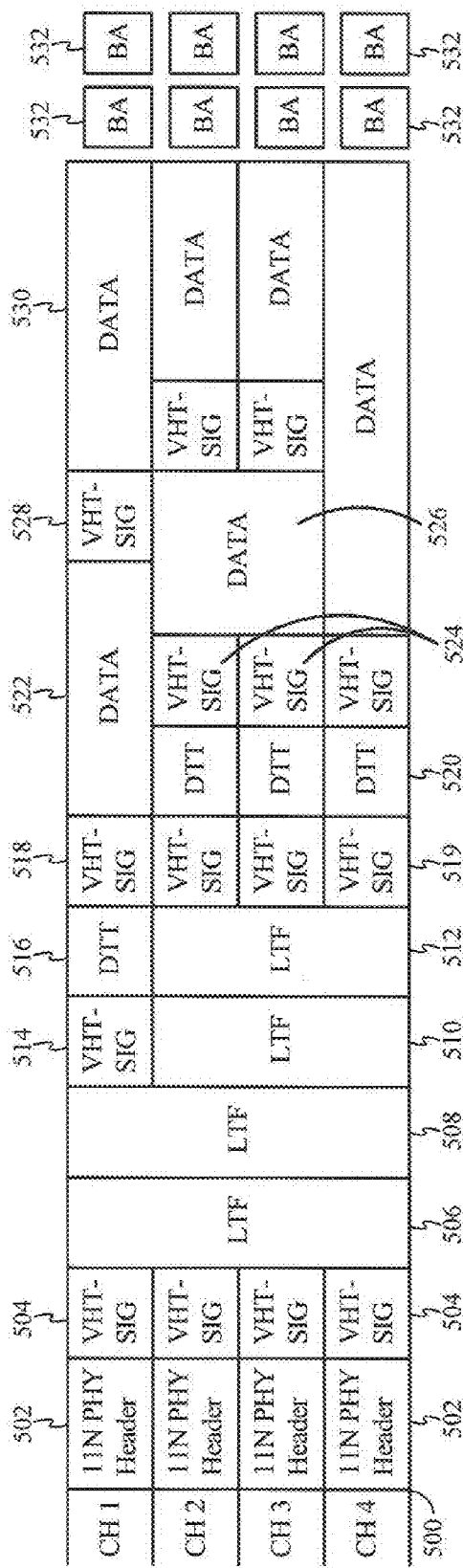
FIG. 5 illustrates an example multiband Aggregate Physical Layer Protocol Data Unit (APPDU) structure in accordance with certain aspects of the present disclosure.

Communicating between wireless nodes using multiple frequency bands may be achieved by employing a multiband Aggregate Physical Layer Protocol Data Unit (APPDU) frame structure. FIG. 5 illustrates an example multiband APPDU structure 500 in accordance with certain aspects of the present disclosure. A physical layer header 502 may be followed by a very high throughput signal (VHT-SIG) fields 504 on each frequency band. The VHT-SIG fields 504 may provide, for example, information to STAs about bandwidths of long training fields (LTFs) 506-512. Each of the VHT-SIG fields 504 transmitted over one of the frequency bands may comprise information about a number of LTFs to be transmitted over that one frequency band.

Multichannel LTFs 506-512 may be sent across all tones including the guard tones, as illustrated in FIG. 5. The LTFs may be transmitted over the multiband channels in a manner that allows each STA to perform channel estimation over the one or more channels allocated to the STA. In each channel, a number of available LTFs may be equal to a number of spatial streams used in that particular channel. For example, as illustrated in FIG. 5, only two spatial streams may be used for transmission in channel 1 (i.e, CH1) because only two LTFs 506 and 508 may be transmitted over this particular channel. On the other hand, up to four streams may be used for channels 2, 3 and 4 (i.e., CH2, CH3, and CH4), as illustrated in FIG. 5. The LTFs may be transmitted in a manner that allows each STA to perform channel estimation for all utilized spatial streams. In addition, the LTFs may be transmitted in a manner that amortizes a training overhead. The transmitted LTFs may be common for all the STAs. The LTFs may be grouped together before transmission and then transmitted over the multiband channels before data.

A very-high-throughput signal (VHT-SIG) field may be transmitted before a data segment or a training field. The VHT-SIG field may comprise information about utilized modulation-coding scheme (MCS) for data transmission or training indicating a bandwidth of the following data segment or the training field. Furthermore, each transmitted data segment may be accompanied with a separate VHT-SIG field in order to enable change of MCS within a single APPDU.

As illustrated in FIG. 5, a VHT-SIG 514 may precede a downlink transmission time (DTT) field 516, and it may specify a modulation-coding scheme of the DTT field. In the same way, a VHT-SIG 519 may precede another DTT field 520. In addition, before transmitting any data frame, corresponding VHT-SIG field may be transmitted in order to inform a corresponding STA about a bandwidth of incoming data frame. As illustrated in FIG. 5, a VHT-SIG field 518 may precede a data frame 522, a VHT-SIG field 524 may precede a data frame 526, and a VHT-SIG field 528 may precede a data frame 530. It can be also observed that the data frame 526 may utilize two contiguous channels (i.e., channels CH2 and CH3). Following successful data reception at each STAs, a Block Acknowledgement message 532 may be uploaded to an access point.

Uplink transmission time for the Block Acknowledgement message 532 and the corresponding channel may be specified using a DTT field or a Block Acknowledgement control field of a Media Access Control (MAC) header transmitted within data frames. The STA may listen for the DTT frame in order to determine when to start decoding and demodulation of received data. Once the DTT frame has been decoded at the STA, then the STA may know when its data will arrive, and hence the STA may switch off its decoder and demodulator until the data arrives. In this way, power dissipation at the STA may be reduced.

Figure 6:
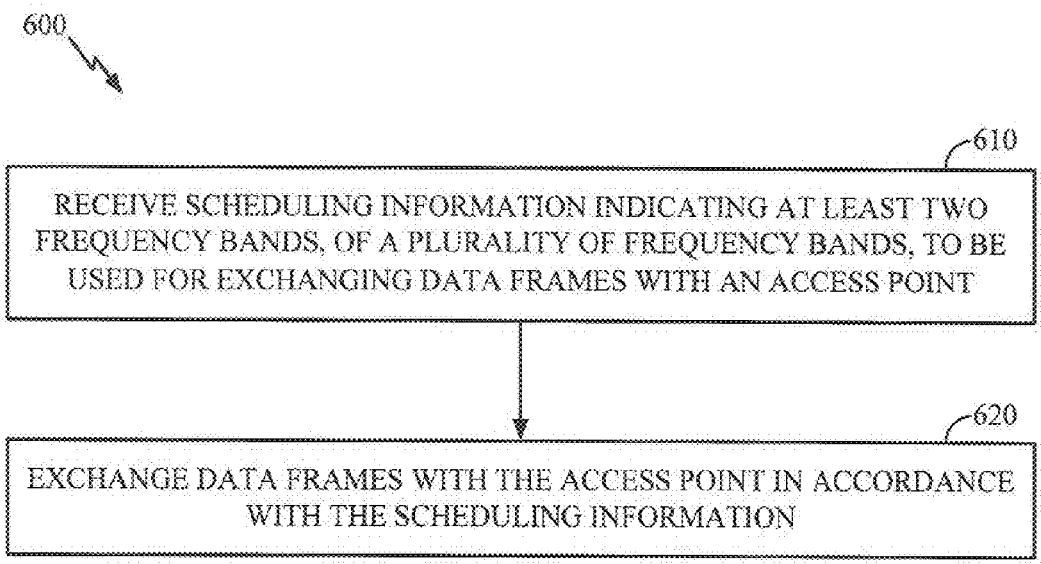
FIG. 6 illustrates example operations for communicating between a station and an access point using multiple frequency bands in accordance with certain aspects of the present disclosure.

FIG. 6 illustrates example operations 600 for communicating between a STA and an access point using multiple frequency bands in accordance with certain aspects of the present disclosure. At 610, scheduling information may be received at the STA indicating at least two frequency bands of a plurality of frequency bands to be used for exchanging data frames with an access point. At 620, data frames may be exchanged with the access point in accordance with the scheduling information.

Figure 7:
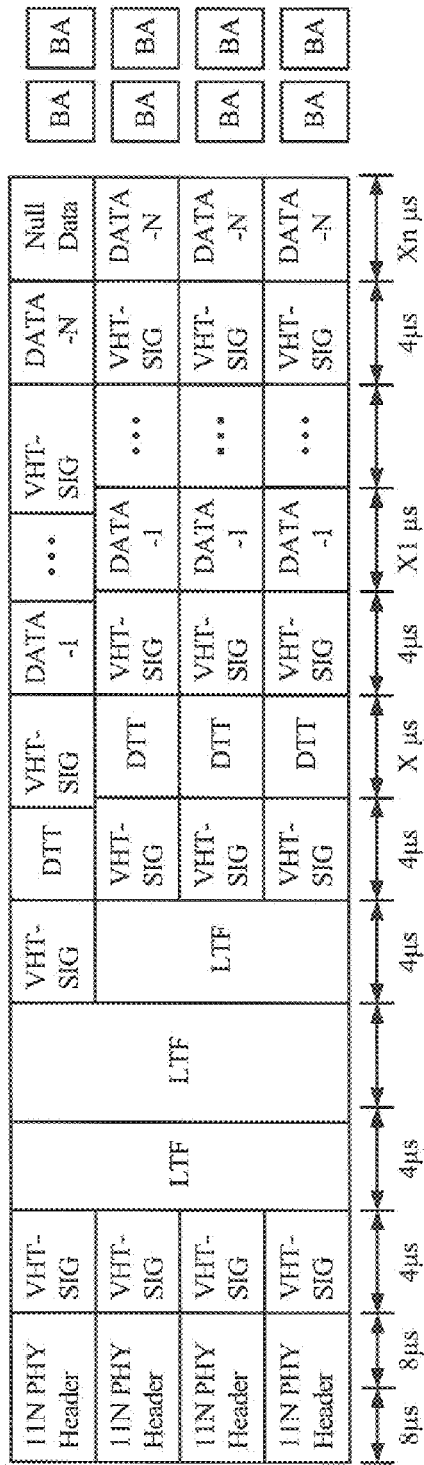
FIG. 7 illustrates an example of discrete APPDUs transmitted on a plurality of frequency sub-bands in accordance with certain aspects of the present disclosure.
Figure 8:
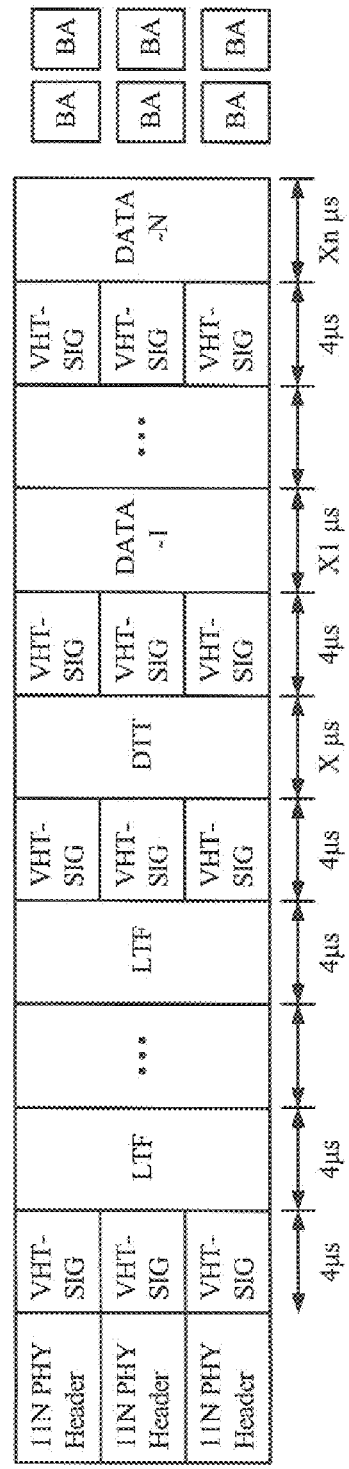
FIG. 8 illustrates an example of a single contiguous band APPDU in accordance with certain aspects of the present disclosure.

FIG. 7 illustrates an example of discrete APPDUs transmitted on multiple sub-bands (e.g., 20 MHz sub-bands) in accordance with certain aspects of the present disclosure. Time duration of each field within APPDUs is also shown in FIG. 7. FIG. 8 illustrates an example of a single contiguous band APPDU. The PHY header at the beginning of the APPDU may be transmitted in accordance with the IEEE 802.11n family of standards, and may comprise a space-time frequency (STF) field and a high throughput signal (HT-SIG) field. The PHY header may be constructed such that legacy users are able to decode the HT-SIG on each channel (i.e., frequency band).

FIG. 9 illustrates an example structure of a VHT-SIG field transmitted within a multi-channel APPDU in accordance with certain aspects of the present disclosure. The VHT-SIG field may comprise a plurality of sub-fields, such as an MCS sub-field, a channel bandwidth (CBW) sub-field, a length sub-field, a sub-field that may specify a packet format, a space-time block-coding (STBC) sub-field, a forward error correction (FEC) coding sub-field, etc. It can be observed from FIG. 9 that size (in bits) of a particular sub-field within the VHT-SIG field may vary depending if a very-high throughput (VHT) or a high throughput (HT) transmission scheme is employed.

Certain aspects of the present disclosure support a modified VHT-SIG field structure for signaling several packet formats. The VHT-SIG field may be designed in such a way that data may be decoded if any multi-channel VHT-SIG is received. In one aspect, alternate configurations of the CBW field and of the packet format field can be supported. Instead of three packet format bits as illustrated in FIG. 9, four bits of the VHT-SIG field may be utilized as packet format bits.

FIG. 10 illustrates examples of different values of the packet format sub-field of the modified VHT-SIG field in accordance with certain aspects of the present disclosure. For example, if the packet format field value is '0000', then the spatial division multiple access (SDMA) transmission technique may be utilized. If the packet format field value is '0001', then a multichannel APPDU may be transmitted using bandwidth of 20 MHz or 80 MHz. On the other hand, if the packet format field value is '0100' or '0101' or '0111', then the multichannel APPDU may be transmitted on different combinations of two or three sub-channels with bandwidths of 20 MHz, as specified in FIG. 10.

A modified MCS sub-field with size of 10 bits may be used to signal a multi-stream MCS. In the case of multi-stream MCS with more than four streams, the VHT-SIG field may be extended to signal different MCS on different streams.

A first VHT-SIG field transmitted within the multichannel APPDU may be dedicated to a long training field (LTF). Multichannel training may be specified by using the packet format field bits as specified for data transmission in order to indicate training for multiple channels. The MCS may be chosen corresponding to a number of utilized channels. A duration field of the VHT-SIG may be used to specify a length of the training field corresponding to the channels indicated by the packet format field.

Multichannel Uplink Protocol

Certain aspects of the present disclosure support amortizing uplink transmission time overhead of preambles and inter-frame spaces over several channels if the preambles are transmitted simultaneously. In order to achieve the transmission time overhead reduction, an uplink multichannel reservation/scheduling mechanism may be required.

Certain aspects of the present disclosure support the approach analogous to request-to-send multiple access (RTS-MA) technique used in spatial division multiple access (SDMA) systems. Each user station (STA) may be assigned a channel for uplink RTS-MA message, where channel allocation may be a function of the application ID (AID). Each AID may belong to one of four groups assuming 80 MHz bandwidth. Slot allocation for transmission based on RTS-MA may be determined from the bit map in a random SDMA (RSDMA) field, as well as information on how many STAs of a given group are present in the RSDMA message.

Figure 11:
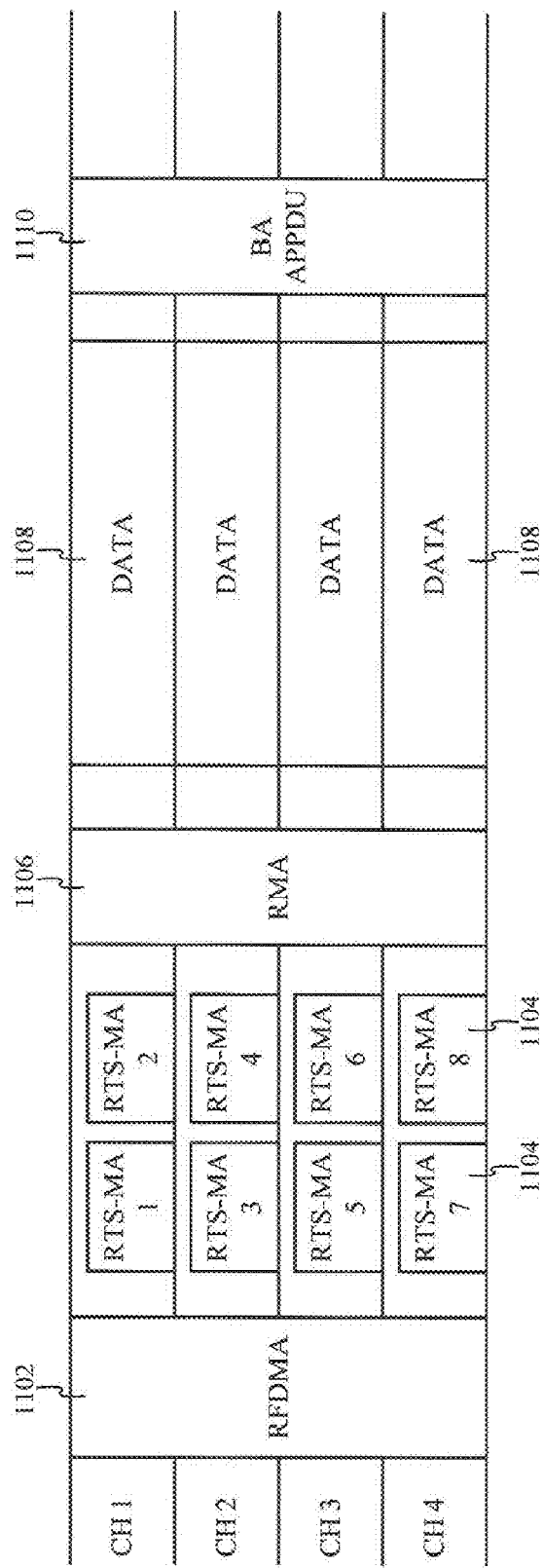
FIG. 11 illustrates an example of uplink transmission on multiple channels in accordance with certain aspects of the present disclosure.

FIG. 11 illustrates an example of uplink transmission on multiple frequency bands in accordance with certain aspects of the present disclosure. A request for frequency division multiple access (FDMA) uplink message (i.e., an RFDMA message) 1102 may be initially transmitted, as illustrated in FIG. 11. For this purpose, the RSDMA message may be reused, such as the one illustrated in FIG. 12. As illustrated in FIG. 11, the RFDMA field 1102 may be followed by a plurality of RTS-MA messages 1104, a Random Multiple Access (RMA) field 1106 and data sections 1108 transmitted over multiple frequency bands. Following the data 1108, a Block Acknowledgement (BA) APPDU message 1110 may be uploaded.

Figure 12:
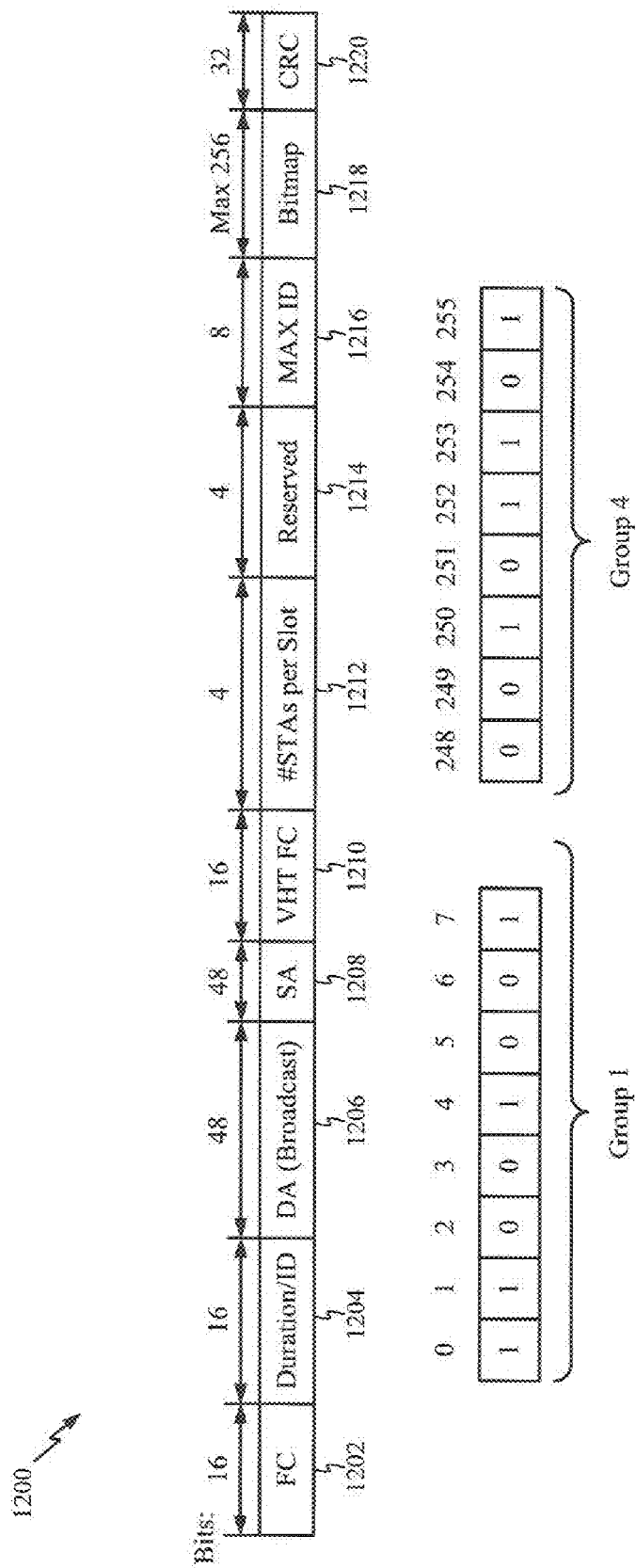
FIG. 12 illustrates an example structure of a random spatial division multiple access (RSDMA) message in accordance with certain aspects of the present disclosure.

FIG. 12 illustrates an example structure of a RSDMA message 1200. A number of STAs per slot value 1212 may be set to one for FDMA. Each STA may check its own group to determine in which slot its RTS-MA message should be transmitted. A MAX ID value 1216 of the RSDMA message 1200 may indicate the highest RTS-MA ID of the STA required to send the RTS-MA message. This value may be used to optimize the size of a Bitmap field 1218 with a maximum size of 255 bits. The Bitmap field 1218 may indicate a mask for the STAs that can send the RTS-MA message. Different mask may be employed for each group of STAs, as illustrated in FIG. 12 for group 1 and group 4.

Figure 13:
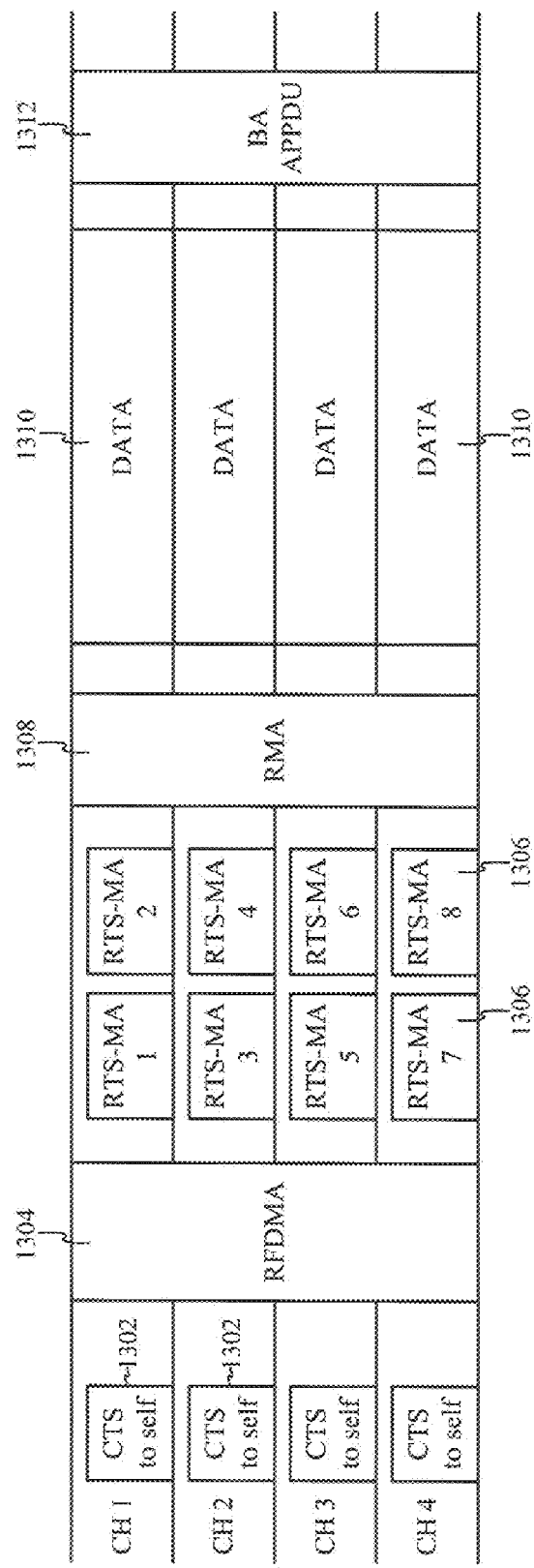
FIG. 13 illustrates an example of uplink channel reservation and uplink transmission in accordance with certain aspects of the present disclosure.

FIG. 13 illustrates an example of uplink channel reservation and uplink transmission in accordance with certain aspects of the present disclosure. An access point (AP) may initially send a "clear-to-send (CTS) to self" message 1302 on channels for which the APPDU has been formed. A clear-to-send network allocation vector (CTS NAV) may reserve time until a Block Acknowledgement (BA) 1312 is transmitted.

As illustrated in FIG. 13, the CTS-to-self messages 1302 may be followed by a RFDMA field 1304, RTS-MA messages 1306, a RMA field 1308 and data sections 1310 transmitted over multiple frequency bands. Channels may be chosen for uplink transmission using either an Enhanced Distributed Channel Access (EDCA) protocol or a Priority Inter-frame Space (PIFS) access protocol. The EDCA protocol may use CW factors scaled by a number of potential uplink STAs in order to reflect fairer uplink access.

Figure 4A:
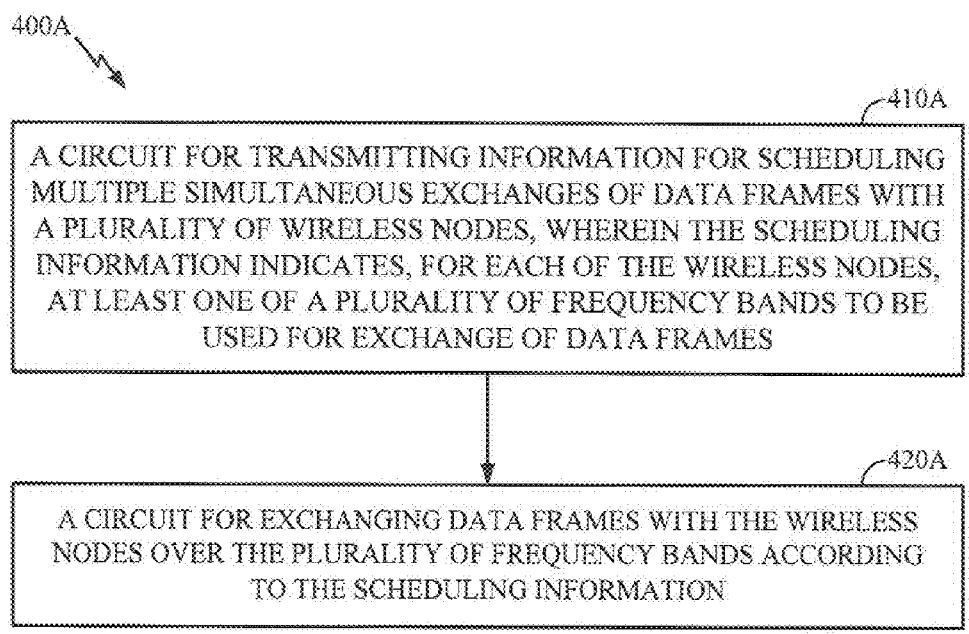
FIG. 4A illustrates example components capable of performing the operations illustrated in FIG. 4.
Figure 6A:
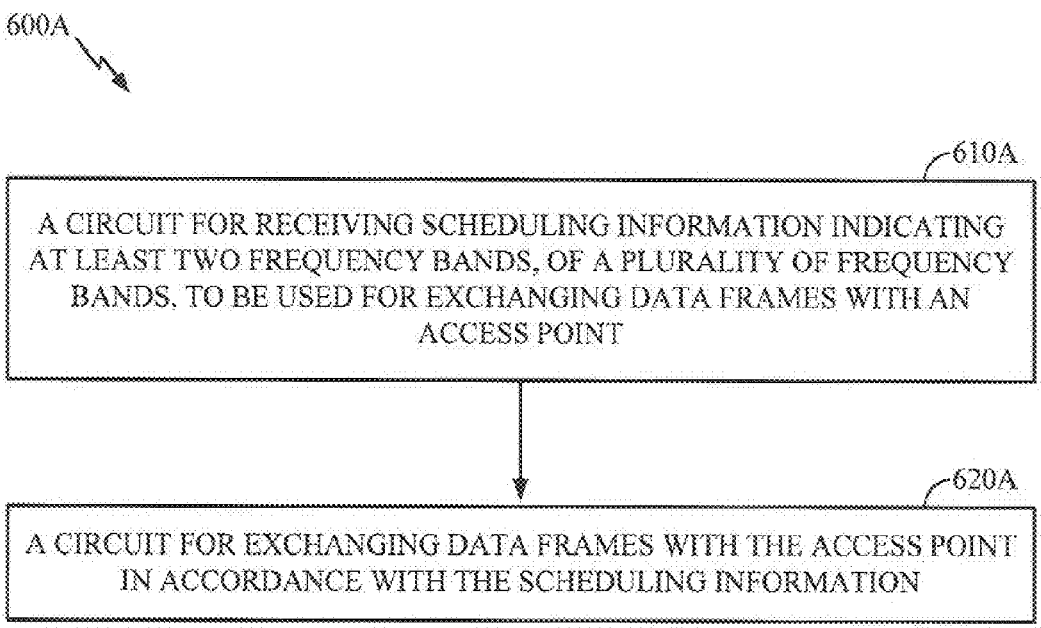
FIG. 6A illustrates example components capable of performing the operations illustrated in FIG. 6.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 410-420 and 610-620 illustrated in FIGS. 4 and 6 correspond to circuit blocks 410A-420A and 610A-620A illustrated in FIGS. 4A and 6A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

The invention claimed is:

1. A method for wireless communications, comprising:
transmitting, by an apparatus, a data unit comprising information for scheduling multiple simultaneous exchanges of data frames with a plurality of wireless nodes, wherein the scheduling information indicates, for each of the plurality of wireless nodes, at least one of a plurality of frequency bands to be used for exchange of at least one of the data frames, and wherein the scheduling information comprises packet format bits that indicate simultaneous transmissions of the data frames over multiple of the frequency bands; and
transmitting a plurality of very high throughput signal (VHT-SIG) fields over the plurality of frequency bands; after the transmission of the plurality of VHT-SIG fields, transmitting a plurality of long training fields (LTFs) over the plurality of frequency bands, wherein each of the plurality of VHT-SIG fields comprises information about a number of LTFs transmitted over each of the plurality of frequency bands;
exchanging the data frames between the apparatus and the plurality of wireless nodes over the plurality of frequency bands according to the scheduling information.

2. The method of claim 1, wherein:
the scheduling information indicates one or more of the frequency bands for each of the wireless nodes to use for receiving at least one of the data frames; and
the scheduling information indicates one or more of the frequency bands for each of the wireless nodes to use for acknowledging reception of at least one of the data frames.

3. The method of claim 1, wherein the frequency bands comprise contiguous frequency bands.

4. The method of claim 1, wherein the LTFs are to be used for channel estimation of a number of spatial streams used for exchanging the at least one data frame.

5. The method of claim 1, wherein the LTFs comprise LTFs common for all the wireless nodes.

6. The method of claim 5, wherein transmitting the LTFs common for all the wireless nodes comprises:
grouping together all the LTFs; and
transmitting the grouped LTFs over the plurality of frequency bands prior to exchanging the data frames.

7. The method of claim 1, wherein the scheduling information is transmitted redundantly on at least two of the frequency bands.

8. The method of claim 1, further comprising:
transmitting, to the wireless node, a transmission time (TT) frame over one or more of the frequency bands prior to the exchange of one or more of the data frames over the one or more frequency bands.

9. An apparatus for wireless communications, comprising:
a transmitter configured to transmit a data unit comprising information for scheduling multiple simultaneous exchanges of data frames with a plurality of wireless nodes, wherein the scheduling information indicates, for each of the plurality of wireless nodes, at least one of a plurality of frequency bands to be used for exchange of at least one of the data frames, and wherein the scheduling information comprises packet format bits indicate simultaneous transmissions of the data frames over multiple of the frequency bands, wherein the transmitter is further configured to transmit a plurality of very high throughput signal (VHT-SIG) fields over the plurality of frequency bands and, after the transmission of the plurality of VHT-SIG fields, transmit a plurality of long training fields (LTFs) over the plurality of frequency bands, wherein each of the plurality of VHT-SIG fields comprises information about a number of LTFs transmitted over each of the plurality of frequency bands; and
a circuit configured to exchange the data frames with the plurality of wireless nodes over the plurality of frequency bands according to the scheduling information.

10. The apparatus of claim 9, wherein:
the scheduling information indicates one or more of the frequency bands for each of the wireless nodes to use for receiving at least one of the data frames; and
the scheduling information indicates one or more of the frequency bands for each of the wireless nodes to use for acknowledging reception of at least one of the data frames.

11. The apparatus of claim 9, wherein the frequency bands comprise contiguous frequency bands.

12. The apparatus of claim 9, wherein the LTFs are to be used for channel estimation of a number of spatial streams used for exchanging the at least one data frame.

13. The apparatus of claim 9, wherein the LTFs comprise LTFs common for all the wireless nodes.

14. The apparatus of claim 13, wherein the transmitter is configured to transmit the LTFs common for all the wireless nodes by:
grouping together all the LTFs; and
transmitting the grouped LTFs over the plurality of frequency bands prior exchanging to the data frames.

15. The apparatus of claim 9, wherein the scheduling information is transmitted redundantly on at least two of the frequency bands.

16. The apparatus of claim 9, wherein the transmitter is further configured to:
transmit, to the wireless node, a transmission time (TT) frame over one or more of the frequency bands prior to the exchange of one or more of the data frames over the one or more frequency bands.

17. An apparatus for wireless communications, comprising:
means for transmitting a data unit comprising information for scheduling multiple simultaneous exchanges of data frames with a plurality of wireless nodes, wherein the scheduling information indicates, for each of the wireless nodes, at least one of a plurality of frequency bands to be used for exchange of at least one of the data frames, and wherein the scheduling information comprises packet format bits that indicate simultaneous transmissions of the data frames over multiple of the frequency bands, wherein the transmitting means is further configured to transmit a plurality of very high throughput signal (VHT-SIG) fields over the frequency bands and, after the transmission of the plurality of VHT-SIG fields, transmit a plurality of long training fields (LTFs) over the plurality of frequency bands, wherein each of the plurality of VHT-SIG fields comprises information about a number of LTFs transmitted over each of the plurality of frequency bands; and
means for exchanging the data frames with the plurality of wireless nodes over the plurality of frequency bands according to the scheduling information.

18. The apparatus of claim 17, wherein:
the scheduling information indicates one or more of the frequency bands for each of the wireless nodes to use for receiving at least one of the data frames; and
the scheduling information indicates one or more of the frequency bands for each of the wireless nodes to use for acknowledging reception of at least one of the data frames.

19. The apparatus of claim 17, wherein the frequency bands comprise contiguous frequency bands.

20. The apparatus of claim 17, wherein the LTFs are to be used for channel estimation of a number of spatial streams used for exchanging the at least one data frame.

21. The apparatus of claim 17, wherein the LTFs comprise LTFs common for all the wireless nodes.

22. The apparatus of claim 21, wherein the means for transmitting is configured to transmit the LTFs common for all the wireless nodes by:
grouping together all the LTFs; and
transmitting the grouped LTFs over the plurality of frequency bands prior to exchanging the data frames.

23. The apparatus of claim 17, wherein the scheduling information is transmitted redundantly on at least two of the frequency bands.

24. The apparatus of claim 17, wherein the means for transmitting is configured to transmit, to the wireless node, a transmission time (TT) frame over one or more of the frequency bands prior to the exchange of one or more of the data frames over the one or more frequency bands.

25. A non-transitory computer-readable medium comprising instructions executable to:
transmit a data unit comprising information for scheduling multiple simultaneous exchanges of data frames with a plurality of wireless nodes, wherein the scheduling information indicates, for each of the wireless nodes, at least one of a plurality of frequency bands to be used for exchange of at least one of the data frames, and wherein the scheduling information comprises packet format bits that indicate simultaneous transmissions of the data frames over multiple of the frequency bands, transmit a plurality of very high throughput signal (VHT-SIG) fields over the plurality of frequency bands; after the transmission of the plurality of VHT-SIG fields, transmit a plurality of long training fields (LTFs) over the plurality of frequency bands, wherein each of the plurality of VHT-SIG fields comprises information about a number of LTFs transmitted over each of the plurality of frequency bands; and
exchange the data frames with the plurality of wireless nodes over the plurality of frequency bands according to the scheduling information.

26. An access point, comprising:
at least one antenna;
a transmitter configured to transmit via the at least one antenna a data unit comprising information for scheduling multiple simultaneous exchanges of data frames with a plurality of wireless nodes, wherein the scheduling information indicates, for each of the wireless nodes, at least one of a plurality of frequency bands to be used for exchange of at least one of the data frames, and wherein the scheduling information comprises packet format bits that indicate simultaneous transmissions of the data frames over multiple of the frequency bands, wherein the transmitter is further configured to transmit a plurality of very high throughput signal (VHT-SIG) fields over the plurality of frequency bands and, after the transmission of the plurality of VHT-SIG fields, transmit a plurality of long training fields (LTFs) over the plurality of frequency bands, wherein each of the plurality of VHT-SIG fields comprises information about a number of LTFs transmitted over each of the plurality of frequency bands; and
a circuit configured to exchange the data frames with the plurality of wireless nodes over the plurality of frequency bands according to the scheduling information.

27. A method for wireless communications, comprising:
receiving a data unit comprising scheduling information indicating at least two frequency bands, of a plurality of frequency bands, to be used for exchanging data frames with an apparatus, wherein the scheduling information comprises packet format bits that indicate simultaneous transmissions of data packets over multiple of the frequency bands, receiving a plurality of very high throughput signal (VHT-SIG) fields over the plurality of frequency bands; after receiving the plurality of VHT-SIG fields, receiving a plurality of long training fields (LTFs) over the plurality of frequency bands, wherein each of the plurality of VHT-SIG fields comprises information about a number of LTFs transmitted over each of the plurality of frequency bands; and
exchanging the data frames with the apparatus in accordance with the scheduling information.

28. The method of claim 27, further comprising:
performing channel estimation over the frequency bands based, at least in part, on one or more of the LFTs.

29. The method of claim 27, further comprising:
receiving a transmission time (TT) frame;
decoding the TT frame
determining an arrival time of at least one of the data frames based on the decoded TT frame; and
entering a low power state prior to the determined arrival time of the at least one data frame.

30. The method of claim 27, wherein:
the scheduling information indicates one or more of the frequency bands to use for receiving at least one of the data frames; and
the scheduling information indicates one or more of the frequency bands for acknowledging reception of the at least one data frame; and
further comprising:
receiving at least one of the data frames on the one or more frequency bands indicated by the scheduling information to use for receiving; and
transmitting an acknowledgement message on the one or more frequency bands indicated by the scheduling information to use for the acknowledging reception, based at least in part, on successfully receiving at least one of the data frames.

31. The method of claim 27, wherein the frequency bands comprise contiguous frequency bands.

32. The method of claim 27, further comprising:
performing channel estimation for one or more of the frequency bands to be used for exchanging at least one of the data frames with the apparatus based on the received one or more LTFs.

33. The method of claim 27, wherein receiving the scheduling information indicating the at least two frequency bands comprises:
receiving the scheduling information on a first one of the frequency bands to be used for exchanging the data frames with the apparatus; and
wherein the scheduling information indicates at least a second one of the frequency bands to be used for exchanging the data frames with the apparatus.

34. The method of claim 27, further comprising:
generating, based on requests solicited by the apparatus, other information for scheduling exchange of data packets with the apparatus;
transmitting the other scheduling information, wherein the other scheduling information indicates at least one of the frequency bands to be used for exchange of the data packets; and
exchanging the data packets with the apparatus over the at least one frequency band according to the other scheduling information.

35. An apparatus for wireless communications, comprising:
a receiver configured to receive a data unit comprising scheduling information indicating at least two frequency bands, of a plurality of frequency bands, to be used for exchanging data frames with another apparatus, wherein the scheduling information comprises packet format bits that indicate simultaneous transmissions of data packets over multiple of the frequency bands, wherein the receiver is further configured to receive a plurality of very high throughput signal (VHT-SIG) fields over the plurality of frequency bands and, after receiving the plurality of VHT-SIG fields, receive a plurality of long training fields (LTFs) over the plurality of frequency bands, wherein each of the plurality of VHT-SIG fields comprises information about a number of LTFs transmitted over each of the plurality of frequency bands; and
a circuit configured to exchange the data frames with the other apparatus in accordance with the scheduling information.

36. The apparatus of claim 35, further comprising:
a circuit configured to perform channel estimation over the frequency bands based, at least in part, on one or more of the LTFs.

37. The apparatus of claim 35, wherein the receiver is further configured to receive a transmission time (TT) frame, and further comprising:
a decoder configured to decode the TT frame;
a first circuit configured to determine an arrival time of at least one of the data frames based on the decoded TT frame; and
a second circuit configured to enter a low power state prior to the determined arrival time of the at least one data frame.

38. The apparatus of claim 35, wherein:
the scheduling information indicates one or more of the frequency bands to use for receiving at least one of the data frames; and
the scheduling information indicates one or more of the frequency bands for acknowledging reception of the at least one data frame; and
the receiver is configured to receive at least one of the data frames on the one or more of the frequency bands indicated by the scheduling information to use for receiving; and
the transmitter is configured to transmit an acknowledgement message on the one or more of the frequency bands indicated by the scheduling information to use for acknowledging reception, based at least in part, on successfully receiving at least tone of the data frames.

39. The apparatus of claim 35, wherein the frequency bands comprise contiguous frequency bands.

40. The apparatus of claim 35, wherein the receiver is further configured to receive one or more long training fields (LTFs); and
an estimator configured to perform channel estimation for one or more of the frequency bands to be used for exchanging at least one of the data frames with the other apparatus based on the received one or more LTFs.

41. The apparatus of claim 35, wherein the receiver configured to receive the scheduling information indicating the at least two frequency bands is configured to receive the scheduling information on a first one of the frequency bands to be used for exchanging the data frames with the other apparatus; and
wherein the scheduling information indicates at least a second one of the frequency bands to be used for exchanging the data frames with the other apparatus.

42. The apparatus of claim 35, further comprising:
a generator configured to generate, based on requests solicited by the other apparatus, other information for scheduling exchange of data packets with the other apparatus;
a transmitter configured to transmit the other scheduling information, wherein the other scheduling information indicates at least one of the frequency bands to be used for exchange of the data packets; and
another circuit configured to exchange the data packets with the other apparatus over the at least one frequency band according to the other scheduling information.

43. An apparatus for wireless communications, comprising:
means for receiving a data unit comprising scheduling information indicating at least two frequency bands, of a plurality of frequency bands, to be used for exchanging data frames with another apparatus, wherein the scheduling information comprises packet format bits that indicate simultaneous transmissions of data packets over multiple of the frequency bands, wherein the receiving means is further configured to receive a plurality of very high throughput signal (VHT-SIG) fields over the plurality of frequency bands and, after receiving the plurality of VHT-SIG fields, receive a plurality of long training fields (LTFs) over the plurality of frequency bands, wherein each of the plurality of VHT-SIG fields comprises information about a number of LTFs transmitted over each of the plurality of frequency bands; and
means for exchanging the data frames with the other apparatus in accordance with the scheduling information.

44. The apparatus of claim 43, further comprising:
means for performing channel estimation over the frequency bands based, at least in part, on one or more of the LFTs.

45. The apparatus of claim 43, wherein the means for receiving is configured to receive a transmission time (TT) frame; and
further comprising
means for decoding the TT frame;
means for determining an arrival time of at least one of the data frames based on the decoded TT frame; and
means for entering a low power state prior to the determined arrival time of the at least one data frame.

46. The apparatus of claim 43, wherein:
the scheduling information indicates one or more of the frequency bands to use for receiving at least one of the data frames; and
the scheduling information indicates one or more of the frequency bands for acknowledging reception of the at least one data frame; and the means for receiving is further configured to receive at least one of the data frames based on the one or more of the frequency bands indicated by the scheduling information to use for receiving; and further comprising:

means for transmitting an acknowledgement message on the one or more of the frequency bands indicated by the scheduling information to use for acknowledging reception, based at least in part, on successfully receiving at least tone of the data frames.

47. The apparatus of claim 43, wherein the frequency bands comprise contiguous frequency bands.

48. The apparatus of claim 43, wherein the means for receiving is configured to receive one or more long training fields (LTFs); and further comprising:

means for performing channel estimation for one or more of the frequency bands to be used for exchanging at least one of the data frames with the other apparatus based on the received one or more LTFs.

49. The apparatus of claim 43, wherein the means for receiving the scheduling information indicating the at least two frequency bands is configured to receive the scheduling information on a first one of the frequency bands to be used for exchanging the data frames with the other apparatus, and wherein the scheduling information indicates at least a second one of the frequency bands to be used for exchanging the data frames with the other apparatus.

50. The apparatus of claim 43, further comprising:

means for generating, based on requests solicited by the other apparatus, other information for scheduling exchange of data packets with the other apparatus;

means for transmitting the other scheduling information, wherein the other scheduling information indicates at least one of the frequency bands to be used for exchange of the data packets; and means for exchanging the data packets with the other apparatus over the at least one frequency band according to the other scheduling information.

51. A non-transitory computer-readable medium comprising instructions executable to:

receive a data unit comprising scheduling information indicating at least two frequency bands, of a plurality of frequency bands, to be used for exchanging data frames with an apparatus, wherein the scheduling information comprises packet format bits that indicate simultaneous transmissions of data packets over multiple of the frequency bands, receive a plurality of very high throughput signal (VHT-SIG) fields over the plurality of frequency bands; after receiving the plurality of VHT-SIG fields, receive a plurality of long training fields (LTFs) over the plurality of frequency bands, wherein each of the plurality of VHT-SIG fields comprises information about a number of LTFs transmitted over each of the plurality of frequency bands; and exchange the data frames with the apparatus in accordance with the scheduling information.

52. An access terminal, comprising:

at least one antenna;

a receiver configured to receive via the at least one antenna a data unit comprising scheduling information indicating at least two frequency bands, of a plurality of frequency bands, to be used for exchanging data frames with an access point, wherein the scheduling information comprises packet format bits that indicate simultaneous transmissions of data packets over multiple of the frequency bands, wherein the receiver is further configured to receive a plurality of very high throughput signal (VHT-SIG) fields over the plurality of frequency bands and, after receiving the plurality of VHT-SIG fields, receive a plurality of long training fields (LTFs) over the plurality of frequency bands, wherein each of the plurality of VHT-SIG fields comprises information about a number of LTFs transmitted over each of the plurality of frequency bands; and a circuit configured to exchange the data frames with the access point in accordance with the scheduling information.

\* \* \* \* \*